(12) United States Patent
Strasser

(10) Patent No.: US 7,440,677 B2
(45) Date of Patent: Oct. 21, 2008

(54) DETECTION OF COPY PROTECTION INDICATORS OR REDISTRIBUTION CONTROL INDICATORS IN AN ANALOG VIDEO SIGNAL

(75) Inventor: David A. Strasser, Toronto (CA)

(73) Assignee: ATI Technologies Inc., Markham, Ontario ( * ) Notice: Subject to any disclaimer, the term of this patent is extended or adjusted under 35 U.S.C. 154(b) by 585 days.

(21) Appl. No.: 11/019,246

(22) Filed: Dec. 23, 2004

(65) Prior Publication Data

US 2006/0140585 A1 Jun. 29, 2006

(51) Int. Cl.
H04N 7/08 (2006.01)

(52) U.S. Cl. .......................... 386/94; 348/465; 348/473

(58) Field of Classification Search .................... 386/94, 386/95; 348/460, 468, 476–479, 473, 558
See application file for complete search history.

(56) References Cited

U.S. PATENT DOCUMENTS

| 4,891,703 A * | 1/1990 | Noudan ...................... 348/460 |
| 5,822,425 A * | 10/1998 | Ezaki et al. .................... 386/94 |
| 6,437,830 B1 * | 8/2002 | Horlander .................... 348/478 |
| 6,587,153 B1 * | 7/2003 | Unemura .................... 348/468 |

* cited by examiner

Primary Examiner—David E Harvey

(57) ABSTRACT

To detect at least one of a copy protection indicator and a redistribution control indicator in an analog video signal, the video format of the analog video signal is determined, e.g., by detecting the horizontal frequency and vertical frequency of the signal. Based at least on the determined video format, a region of the analog video signal that may contain the indicator is identified. The region may for example be one or more video lines in a vertical blanking interval. The region is examined until the indicator is detected. The indicator is confirmed, e.g., by re-detecting one or more occurrences of the same indicator value(s) later in the video signal. Once confirmed, the indicated copy protection and/or redistribution control may be effected by limiting either or both of copying and redistribution of the analog video signal. The indicator may for example be Copy Generation Management System Analog plus Redistribution Control (CGMS-A+RC) information.

18 Claims, 6 Drawing Sheets

DETECTION OF COPY PROTECTION INDICATORS OR REDISTRIBUTION CONTROL INDICATORS IN AN ANALOG VIDEO SIGNAL

FIELD OF THE INVENTION

The present invention relates to analog video, and more particularly to the detection of copy protection indicators or redistribution control indicators in an analog video signal.

BACKGROUND OF THE INVENTION

When an analog video signal is received by a conventional television set having a Cathode Ray Tube (CRT), a picture is "drawn" on the CRT by sweeping an electron beam horizontally across the face of the CRT one line at a time. The sweeping of the electron beam is controlled by electromagnets in the television set. Each horizontal sweep across the face of the CRT is referred to as a scan line or simply as a line. The brightness at various points along a scan line is determined by the content of the electronic video signal. A complete picture formed from multiple scan lines is referred to as a frame.

At the end of each scan line, the electron beam is repositioned to the beginning of the next line. This is referred to as horizontal retrace. Due to the inductance of the electromagnets used to control the beam, horizontal retrace takes a certain amount of time. Accordingly, analog video signal includes not only active video regions comprising content information but also "gaps", referred to as horizontal blanking intervals, which instruct the CRT to turn off its electron beam and perform horizontal retrace. The gaps are of sufficient duration to allow horizontal retrace to be completed. A similar mechanism is used to cause the electron beam to be repositioned from the bottom of the CRT back to the top after the last scan line has been drawn. The latter is referred to as vertical retrace.

The portion of an analog video signal which instructs the CRT to perform vertical retrace is referred to as the vertical blanking interval (VBI) region. The VBI region primarily consists of blank video lines, which follow similar conventions as active video lines but are not representative of displayed video content. VBI lines are considered to be part of an overall frame, despite the fact that they are not displayed. For example, in a television set whose CRT displays 480 scan lines of video content, each frame may actually include 45 additional, non-displayed lines which comprise the VBI region, for a total of 525 lines per frame. VBI lines may be adapted to carry various types of information associated with the video signal, such as closed captioning, content advisory, or aspect format information for example.

Images displayed on a CRT are redrawn many times per second to create the illusion of continuous motion. Continuous redrawing is performed using either interlaced or progressive scanning techniques.

In interlaced scanning, the overall frame is divided into two halves which are referred to as fields. Each field includes alternate rows (scan lines) of the frame. For example, the first field (or "top field" or "odd field") may include odd numbered rows while the second field (or "bottom field" or "even field") includes even numbered rows. Within the analog video signal, which may be referred to as an interlaced video signal, top and bottom fields are transmitted in sequence. A CRT receiving the signal will thus first draw the entire top field, then the entire bottom field, then the entire top field again, and so forth, in alternating fashion. Most CRT television sets employ interlaced scanning.

In progressive scanning, frames are not divided into fields. Rather, each line of a frame (whether active or VBI) is appears in sequence within the video signal, and the CRT draws each active video line of the frame in sequence before a vertical retrace occurs. The signal may be referred to as a progressive video signal in this case. Traditionally, the analog video signals received from a tower are interlaced rather than progressive video signals, however a television may generate a progressive signal from an interlaced signal in a process known as de-interlacing. Many computer monitors use progressive scanning because it may yield less "flicker" than interlaced scanning, such that a person may be able to view a picture generated with progressive scanning for longer time periods without eye fatigue than if interlaced scanning were employed.

Although most analog video signals world-wide generally follow similar conventions, analog video signals in different geographical regions may differ in such characteristics as number of scan lines per frame, visible pixels per line, horizontal scanning rate (also known as "horizontal frequency") and vertical frame rate (also known as "vertical frequency"). For example, Table 1 illustrates the characteristics of the National Television Systems Committee (NTSC) video format prevalent in the North America and Japan as compared to the characteristics of the Phase Alternating Line (PAL) video format commonly used in Europe and the SEquentiel Couleur Avec Mémoire (SECAM) video format prevalent in France and Russia

TABLE 1

| NTSC and PAL format characteristics | | |
| --- | --- | --- |
| VIDEO FORMAT | NTSC | PAL/SECAM |
| Visible Lines/Frame | Approximately 480 (525 total lines) | Approximately 576 (625 total lines) |
| Visible Pixels/Line | Determined by bandwidth, ranges from 320 to 650 | Determined by bandwidth, ranges from 320 to 720 |
| Horizontal Rate (KHz) | 15.734 | 15.625 |
| Vertical Frame Rate (Hz) | 29.97 | 25 |

In most analog video formats, the VBI region may be used to carry Copy Generation Management System Analog plus Redistribution Control (CGMS-A+RC) information. CGMS-A+RC (pronounced "CGMSA plus RC") information is an indicator of copy protection rights and redistribution control rights having two components.

The first component (CGMS-A) is a copy protection indicator which indicates whether and to what extent the associated video content may be copied. The objective of including copy protection information within an analog video signal may be to permit analog video sink devices (e.g. television sets, Video Cassette Recorders (VCRs), optical disc recorders such as Digital Versatile Disc (DVD) recorders, or Personal Computer (PC) television cards) receiving the signal to automatically take steps to prevent inappropriate copying of copyrighted content.

The second component (+RC) is a redistribution control indicator which indicates whether the video content may be redistributed, e.g., uploaded to a server on the Internet, broadcast unencrypted over a wireless network, or more generally, output over a digital output without some sort of content protection or recorded to media for long term storage. Content protection, which may constitute encryption for example, is different from copy protection, which generally precludes the making of unauthorized copies. Video may be content-protected but not copy-protected. In this case, the owner should be able to reproduce the video, e.g., by "burning" the video onto one or more recordable DVDs, but each reproduction will be viewable only by the owner (e.g. the owner may be the only one to have a key necessary to decrypt the content), rather than by anyone. Thus when redistribution control is effected, a device may automatically take steps to preclude redistribution of the video content (e.g. by automatically applying encryption before outputting a signal over a digital output of the device or automatically applying encryption before recording the content to media for long term storage).

Various VBI standards have been developed in an attempt to standardize the type and format of information carried in the VBI region of analog video signals. Some VBI standards specify carriage of both of the CGMS-A component and +RC component. For example, the CEA-805-A standard published by the Consumer Electronics Association (CEA) dictates that CGMS-A information shall be encoded using two bits and RC information shall be encoded using a single bit, as shown in Table 2 below:

TABLE 2

CGMS-A and RC Bit Definitions - CEA 805-A Standard

| CGMS-A Bit Values | CGMS-A Definition | RC Bit Value | RC Definition |
|---|---|---|---|
| 00 | Copy protection not asserted (i.e. copying permitted without restriction) | 0 | Redistribution control not asserted (i.e. redistribution via Internet is permitted) |
| 01 | Copy no more (one generation copy has already been made) | 1 | No redistribution is permitted |
| 10 | Copy one generation (no copy has been made yet) | | No redistribution is permitted |
| 11 | No copying is permitted | | |

It is noted that the CEA 805-A standard is presently undergoing revision, thus the bit definitions of Table 2 may change over time.

Other VBI standards may specify carriage of the CGMS-A component without the +RC component. Table 3 enumerates the VBI standards that are currently most prevalent. Some contention exists between the standards; efforts are being made to harmonize them. It is possible that some standards may be developed which specify carriage of only the +RC component without the CGMS-A component.

TABLE 3

VBI Standards

| VBI Standard | CGMS-A (and optionally + RC) Repetition Rate | Geographic Region of Common Use |
|---|---|---|
| CEA-608-B | CGMS-A + RC repetition rate for 525i analog video carriage = 10 to 30 seconds (worst case) | North America |
| International Electrotechnical Commission (IEC) 61880 and IEC 61880-2 | CGMS-A at least twice every 2 seconds | International |
| CEA-805-A | Type A packets: allows CGMS-A + RC every field/frame (deprecated). Type B packets: allows CGMS-A + RC every field/frame. | North America |
| European Telecommunications Standard Institute (ETSI) EN 300 294 | Allows CGMS-A every field; recommends sink response within 120 milliseconds. | Europe and Australia |
| IEC 62375 | Allows CGMS-A every frame; recommends sink response within 120 milliseconds. | International |
| Japanese Electronics and Information Technology Industries Associates (JEITA) EIA-J CPR 1204 Series and ARIB TR-B15 | CGMS-A twice every two seconds | Japan |

For convenience, the term "CGMS-A+RC information" will be used herein to generically refer to either or both of CGMS-A information and +RC information.

The second column of Table 3 indicates the rate at which CGMS-A+RC information is repeated within analog video signals under the relevant VBI standard indicated in column 1. CGMS-A+RC information is repeated to ensure that the information will be available to analog video sink devices regardless of the moment at which the devices lock to the signal. The repetition rate for the CGMS-A+RC information depends on the operative VBI standard. For example, as shown in Table 3, CGMS-A+RC information may be repeated as often as every field or frame or as infrequently as twice every two seconds or longer. The identity of the VBI line in which the CGMS-A+RC information is encoded may differ depending upon the operative VBI standard and the operative video format.

Despite the existence of various CGMS-A+RC formats, many providers of analog video signals (e.g. television networks) are not yet incorporating any CGMS-A+RC information within their analog video signals. Perhaps for this reason, many if not all commercially-available sink devices do not at present attempt to detect or extract CGMS-A+RC information from analog video signals.

It would be desirable for an analog video sink device to be capable of detecting CGMS-A+RC information regardless of the operative VBI standard and the operative analog video format.

SUMMARY OF THE INVENTION

To detect at least one of a copy protection indicator and a redistribution control indicator in an analog video signal, the video format of the analog video signal is determined, e.g., by detecting the horizontal frequency and vertical frequency of the signal. Based at least on the determined video format, a region of the analog video signal that may contain the indicator is identified. The region may for example be one or more video lines in a vertical blanking interval. The region is examined until the indicator is detected. The indicator is confirmed, e.g., by re-detecting one or more occurrences of the same indicator value(s) later in the video signal. Once confirmed, the indicated copy protection and/or redistribution control may be effected by limiting either or both of copying and redistribution of the analog video signal. The indicator may for example be CGMS-A+RC information.

In accordance with an aspect of the present invention there is provided a method comprising: (a) determining a video format of an analog video signal; (b) based at least on the determining, identifying a region of the analog video signal that may contain at least one of a copy protection indicator and a redistribution control indicator; (c) detecting the at least one indicator in the region of the analog video signal; (d) confirming the detected at least one indicator; and (e) limiting at least one of copying and redistribution of the analog video signal in accordance with the confirmed at least one indicator.

In accordance with another aspect of the present invention there is provided a machine-readable medium including machine-executable code for execution at a computing device, comprising: (a) machine-executable code for determining a video format of an analog video signal; (b) machine-executable code for identifying a region of the analog video signal that may contain at least one of a copy protection indicator and a redistribution control indicator based at least on the determining; (c) machine-executable code for detecting the at least one indicator in the region of the analog video signal; (d) machine-executable code for confirming the detected at least one indicator; and (e) machine-executable code for limiting at least one of copying and redistribution of the analog video signal in accordance with the confirmed at least one indicator.

In accordance with yet another aspect of the present invention there is provided a computing device comprising a processor and memory in communication with the processor storing machine-executable code adapting the computing device to: (a) determine a video format of an analog video signal; (b) based at least on the determining, identify a region of the analog video signal that may contain at least one of a copy protection indicator and a redistribution control indicator; (c) detect the at least one indicator in the region of the analog video signal; (d) confirm the detected at least one indicator; and (e) limit at least one of copying and redistribution of the analog video signal in accordance with the confirmed at least one indicator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
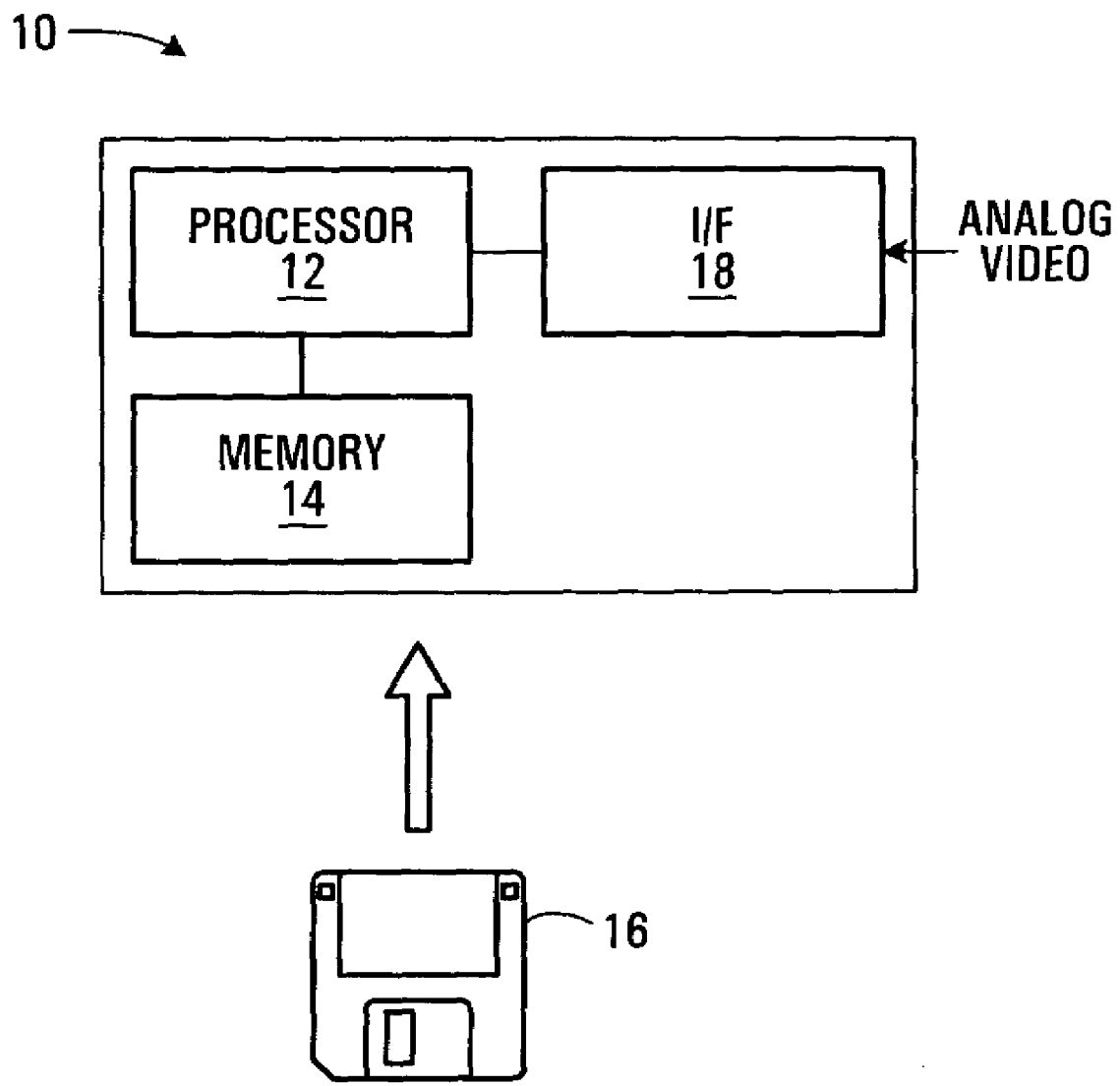
FIG. 1 is a schematic diagram illustrating an exemplary analog video sink device.

FIG. 1 illustrates an exemplary analog video sink device 10. The device 10 may for example be a television set, VCR, optical disk recorder (e.g. DVD recorder), or PC television card. Sink device 10 is a type of computing device which includes a processor 12 as well as volatile and/or non-volatile memory 14. Memory 14 stores machine-executable code for detecting CGMS-A+RC information within a received analog video signal according to an embodiment of the present invention. The machine-executable code may be loaded from a machine-readable medium such as a removable optical or magnetic disk 16 or pre-loaded at manufacturing time for example.

Sink device 10 additionally includes an interface 18 for receiving an analog video signal. The analog video signal may for example be of any of the known formats listed in the first column of Table 4 below:

TABLE 4

VBI Lines Carrying CGMS-A + RC Information for Various Video Formats/Vertical Frequencies and VBI standards

| Video Format | Video Lines/ Picture Rate (in HZ) | VBI Standard | VBI Video Line for CGMS-A + RC Carriage | Geographic Region of Common Use |
| --- | --- | --- | --- | --- |
| ITU-R Rec. BT 470-6 NTSC (System M) PAL (System M), CEA-770.2-C or ARID STD B21 | 525i/59.94 or 60 | CEA-608-B IEC 61880 JEITA EIA-J CPR 1204 | 284 20 and 283 20 and 283 | North America International Japan |
| CEA-770.2-C | 525p/59.94 or 60 | CEA-805-A | 40 (Type A packet) 41 (Type B packet) | North America |
|  |  | IEC 61880-2 | 41 | International |
| ARIB STD B21 |  | JEITA EIA-J CPR 1204-1 | 41 | Japan |
| ITU-R Rec. BT. 470-6 PAL (Systems N, B, B1, G, H, I and D1) and SECAM (Systems D, K, K1 and L) | 625i/50 | ETSI EN 300 294 | 23 | Europe and Rest of World |

TABLE 4-continued

VBI Lines Carrying CGMS-A + RC Information for Various
Video Formats/Vertical Frequencies and VBI standards

| Video Format | Video Lines/ Picture Rate (in HZ) | VBI Standard | VBI Video Line for CGMS-A + RC Carriage | Geographic Region of Common Use |
|---|---|---|---|---|
| ITU-R Rec. BT. 1358 | 625p/50 | IEC 62375 | 43 | Europe and Rest of World |
| CEA-770.3-C | 750p/59.94 or 60 | CEA-805-A | 23 (Type A packet) 24 (Type B packet) | North America |
| ARIB STD B21 | | JEITA EIA-J CPR 1204-1 | 24 | Japan |
| CEA-770.3-C | 1125i/59.94 or 60 | CEA 805-A | 18 and 851 (Type A packet) 19 and 852 (Type B packet) | North America |
| ARIB STD B21 | | JEITA EIA-J CPR 1204-2 | 19 and 852 | Japan |

The video formats indicated in column 1 are known to those skilled in the art. They include International Telecommunication Union Radiocommunication Sector (ITU-R) Recommendation BT.470-6 NTSC (System M), BT.470-6 PAL (System M)CEA 770.2, CEA 770.3, Association of Radio Industries and Business (ARIB) STD B21, ITU-R Rec. BT.470-6, PAL (Systems N, B, B1, G, H, I and D1), SECAM (Systems D, K, K1 and L), and ITU-R Rec. BT.1358.

The second column of Table 4 indicates the number of scan lines per frame in the operative video format of column 1 (which governs the horizontal frequency of the analog video signal) as well as the operative scanning approach (interlaced ("i") or progressive ("p")). For example, "525i" indicates that the frame has 525 total lines and that the analog video signal is an interlaced video signal. The second column also indicates the vertical frequency (sometimes referred to as "picture rate"). For example, vertical frequencies of 50 Hz, 59.94 Hz and 60 Hz are indicated.

Column 3 of Table 4 indicates the operative VBI standard according to which CGMS-A+RC information is inserted into the video signal. As should be apparent from Table 4, the same VBI standard may be employed in conjunction with more than one video format, however some VBI standards are not employed with certain video formats.

Column 4 of Table 4 indicates the VBI video line or lines in which CGMS-A+RC information is carried (i.e. the number of the VBI line within which the CGMS-A+RC information is embedded) in a video signal having the format of column 1 which is governed by the VBI standard indicated in columns 3. When two VBI line numbers are indicated, the CGMS-A+ RC information may be included within each of the indicated VBI video lines. Typically the two VBI lines will be in opposite fields of an interlaced video format, so that each field will include a copy of the CGMS-A+RC information. When the operative VBI standard is CEA-805-A, a packet type is also indicated in Column 4. This is due to the fact that the CEA-805-A standard defines two packet types (Type A and Type B), either of which may carry CGMS-A+RC information.

In overview, an analog video sink device is pre-configured to be capable of determining the video format of a received analog video signal by detecting the horizontal frequency and vertical frequency of the signal. Determination of the operative video format is performed in order to simplify the task of searching for embedded CGMS-A+RC information within the received signal, and more particularly to permit searching to be restricted to only those VBI lines which potentially carry embedded CGMS-A+RC information. The identity of the VBI lines potentially carrying CGMS-A+RC information is determined based on knowledge of prevalent VBI standards which may govern the received analog video signal based on its determined video format, or through private agreement.

Once the set of VBI lines potentially carrying embedded CGMS-A+RC information has been identified, the device examines (i.e. samples) those VBI lines until CGMS-A+RC information is detected. The initially detected CGMS-A+RC values are referred to as the baseline CGMS-A+RC values.

If the operative VBI standard employs an integrity mechanism such as a parity bit or a cyclic redundancy check within the VBI region, this mechanism is used to validate the integrity of the detected CGMS-A+RC values. If the payload of the VBI line containing the CGMS-A+RC values fails this integrity check (e.g. due to tolerance mismatches, cabling faults, ground faults, induced noise or other types of impairments), the corresponding CGMS-A+RC values are deemed invalid and are discarded.

After a valid set of baseline CGMS-A+RC values has been detected, the device continues to examine the received analog video signal for further (i.e. repeated) instances of the CGMS-A+RC values. When a repeated instance is detected, it is compared against the baseline CGMS-A+RC values for purposes of confirming the CGMS-A+RC information. Assuming that the CGMS-A+RC information within the video signal has not just changed (e.g. due to a channel change at the sink device or a transition between copyrighted video content and video content for which no copyright is asserted, such as a transition between a network television program and a paid television commercial for example), repeated instances of valid CGMS-A+RC values should match.

Detection of repeated CGMS-A+RC values and comparison against the baseline values continues until either a predetermined time period has transpired or until Z valid CGMS-A+RC values which match the baseline values have been received, where Z is an integer greater than or equal to one (e.g. 3). The predetermined period of time may for example be P frame times or field times, where P is an integer greater than or equal to one which is usually (but not necessarily) substantially larger than Z (e.g. 240). A "frame time" is the time required to receive a frame of an analog video signal of the determined vertical frequency. A "field time" is the time required to receive a field in of an analog video signal.

If the predetermined time period transpires without receiving Z valid CGMS-A+RC values matching the baseline values, the baseline CGMS-A+RC values are discarded, a new set of baseline CGMS-A+RC values is detected, and confirmation of the new values is once again attempted as described above.

If Z valid CGMS-A+RC values matching the baseline values are received, the baseline CGMS-A+RC values are deemed to be confirmed. In this case, the copy protection and redistribution control rights for the analog video signal's content transition from "unknown" to the confirmed CGMS-A+RC values (i.e. the rights are asserted). Depending upon the confirmed values, this transition may cause copy protection and/or redistribution control enforcement mechanisms (e.g. encryption) to be automatically activated within the sink device. If storage of a representation of the analog video signal is permitted, a recording device may convert the analog video signal to a digital representation which may be, e.g., a digitized, noise-reduced or scaled version of the analog video signal that is either compressed or uncompressed.

Thereafter, the device continues to sample CGMS-A+RC values in the analog video signal until either another predetermined time period has expired or until Z valid CGMS-A+RC values are detected which match either the confirmed CGMS-A+RC values or which match each other. The duration of the latter predetermined time period may differ (but does not necessarily differ) from the initial predetermined time period. For example, the time period may be R frame or field times rather than P frame or field times, where R is an integer greater than or equal to one.

Sampling and reconfirmation of CGMS-A+RC values is periodically repeated to allow any changes in the CGMS-A+RC values within the received analog video signal to be detected.

If at any time a change in the video format is detected (e.g. if the horizontal frequency or vertical frequency changes), operation returns to the initial detection of video format stage. Once the new video format is determined, the above-described CGMS-A+RC information detection and confirmation operation is repeated for the new video format.

Operation of the present embodiment is illustrated in FIGS. 2 to 6 with additional reference to FIG. 1.

Figure 2:
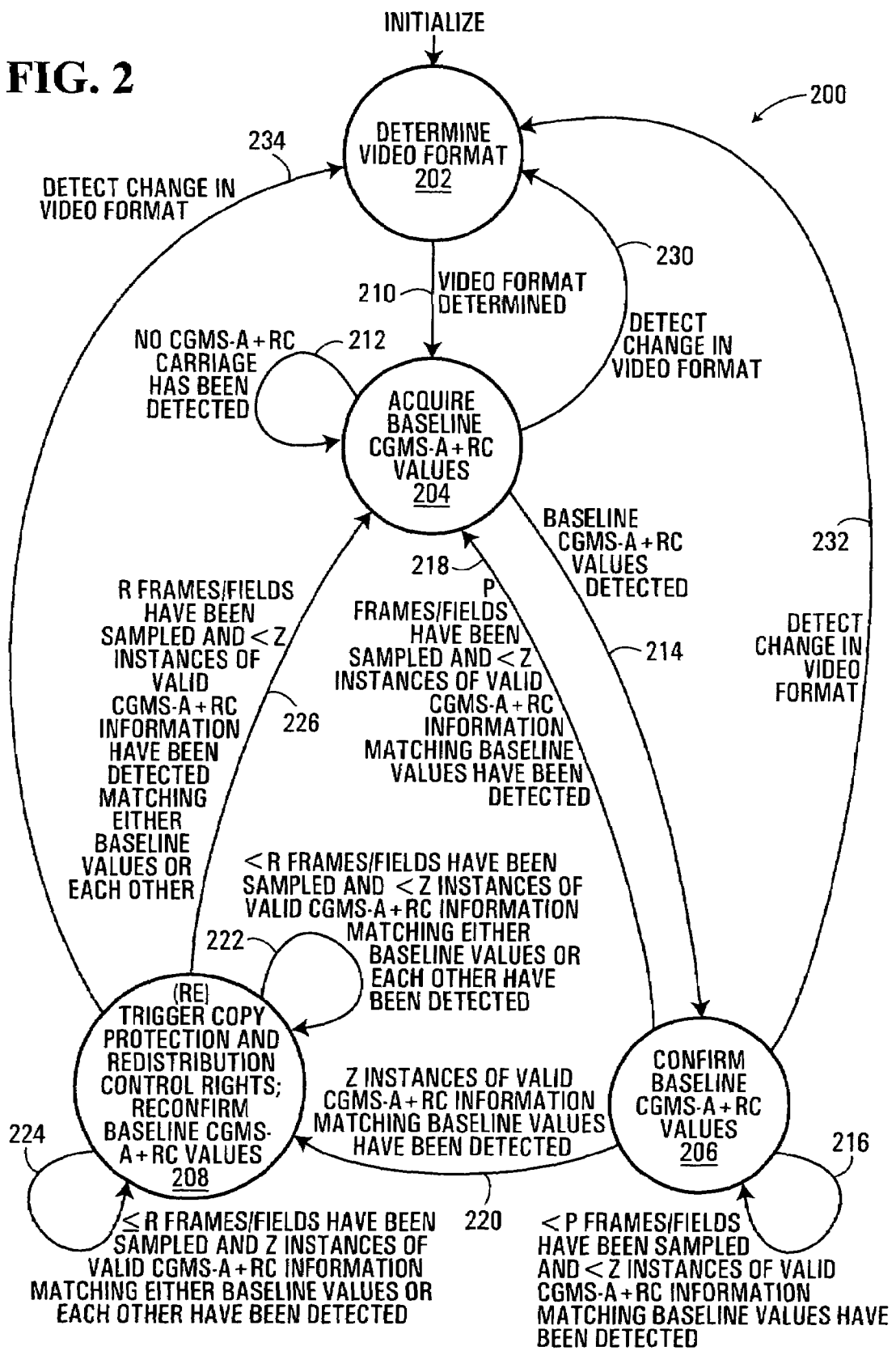
FIG. 2 illustrates a state machine for detecting CGMS-A+RC information in an analog video signal.

Referring to FIG. 2, a state machine 200 for detecting CGMS-A+RC information in an analog video signal is illustrated. State machine 200 may be maintained by an analog video sink device such as device 10 (FIG. 1) for example. FIG. 2 is perhaps best understood when viewed in conjunction with FIGS. 3 and 4, which illustrate different stages of the CGMS-A+RC information detection process.

Referring to FIG. 2, state machine 200 includes four states. Each state corresponds to a different stage in the CGMS-A+RC information detection process. The first state 202 is an initial state which indicates that the video format of a received analog video signal is in the process of being determined. State 202 is typically the first state entered into by an analog video sink device. The second state 204 indicates that the video format have been determined and that the analog video signal is being checked for carriage of CGMS-A+RC information. State 204 may be referred to as the "acquire baseline CGMS-A+RC values" state. The third state 206 indicates that a baseline set of CGMS-A+RC values has been detected and is in the process of being confirmed. The fourth state 208 indicates that CGMS-A+RC values have been confirmed and that copy protection and redistribution control rights indicated by those values have been asserted (i.e. either or both of copying and redistribution of the analog video signal may be limited, depending upon the detected CGMS-A+RC values). State 208 also represents the steady state in which CGMS-A+RC values are periodically sampled and reconfirmed in order to ensure that any changes in CGMS-A+RC values in a received analog video stream are detected.

FIG. 2 further illustrates a number of transitions 210, 212, 214, 216, 218, 220, 222, 224, 226, 228, 230, 232 and 234 between the four states 202, 204, 206 and 208. These transitions are described below.

Figure 3:
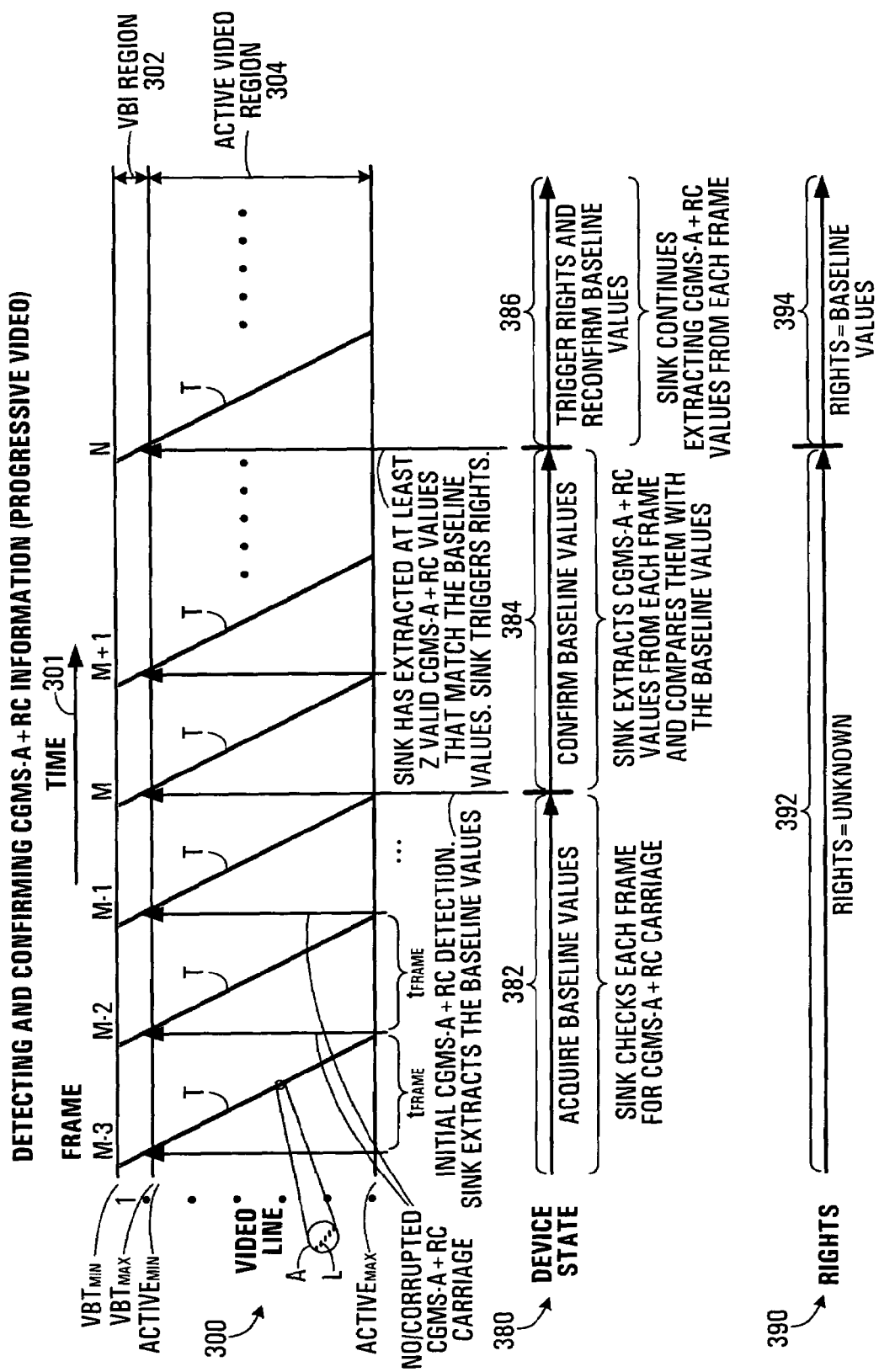
FIG. 3 illustrates operation for detecting and confirming CGMS-A+RC information within a progressive analog video signal.

Referring to FIG. 3, operation of an exemplary sink device 10 (FIG. 1) for detecting and confirming CGMS-A+RC information within an analog video signal employing progressive scanning according to the state machine 200 of FIG. 2 is illustrated. FIG. 3 illustrates a scan trajectory timeline 300, a device state timeline 380, and a rights timeline 390. Time for all three timelines 300, 380 and 390 is indicated on the horizontal axis, as illustrated by arrow 301.

Scan trajectory timeline 300 illustrates the receipt of VBI video lines and active video lines comprising a progressive video signal over time by sink device 10 (FIG. 1). Each frame trajectory T represents the VBI and active video lines of a single frame of the received signal. Frame numbers (e.g. frame M-3, M-2, etc., where M is an integer) are identified above the corresponding trajectories T.

As shown in enlargement A, each trajectory T is actually comprised of a series of discontinuous line segments L. Each line segment L represents either a VBI line or an active video line, depending upon whether the portion of the trajectory T containing the segment L lies within the VBI region 302 or within the active video region 304. VBI lines are numbered $VBI_{min}$ ($VBI_{min}$ typically being 1) to $VBI_{max}$ and active video lines are numbered $Active_{min}$ to $Active_{max}$. The values of $VBI_{min}$, $VBI_{max}$, $Active_{min}$ and $Active_{max}$ are dictated by the video format of the received analog video signal. The amount of time required to receive the VBI lines and active video lines of a single frame ("$t_{frame}$") is dictated by the vertical frequency of the received analog video signal. For purposes of illustration, it is assumed that at least some of the VBI lines in some of the frames of FIG. 3 carry CGMS-A+RC information.

Device state timeline 380 illustrates the state (i.e. the state as per state machine 200 of FIG. 2) of the sink device 10 over time as it performs CGMS-A+RC detection in the analog video signal represented in scan trajectory timeline 300. Timeline 380 has three regions 382, 384 and 386 which correspond to states 204, 206 and 208 (respectively) of FIG. 2, as will be described.

Rights timeline 390 illustrates the copy protection and redistribution control rights asserted at sink device 10 over time as it performs CGMS-A+RC detection in the analog video signal whose lines are represented in scan trajectory timeline 300. Timeline 390 has three regions 392, 394 and 396 which are associated with states 204, 206 and 208 (respectively) of FIG. 2.

For purposes of FIG. 3, it is assumed that the analog video sink device 10 of FIG. 1 has been pre-configured to be capable of identifying the video format of a received analog video signal and has also been adapted to maintain the state machine 200 of FIG. 2. It is also assumed that the device 10 has received an analog video signal of unknown video format, and as a result has entered state 202 (FIG. 2). In this state 202, the device engages in processing to determine the video format of the received signal (not shown in FIG. 3). This processing may include monitoring the analog video signal for horizontal syncs (to determine horizontal frequency) and vertical syncs (to determine vertical frequency, including whether the signal is progressive or interlaced). Horizontal and vertical frequencies are indicative of the pixel clock frequency which forms the basis for VBI data encoding.

Once the video format of the received analog video signal has been determined, the device enters the "acquire baseline CGMS-A+RC values" state 204 via state transition 210 (FIG. 2). This state is indicated in region 382 of device state timeline 380 of FIG. 3. In this state, copy protection and redistribution control rights are as yet unknown, as indicated by region 392 of rights timeline 390. During this time, a default set of copy protection and redistribution control rights may be asserted by the device 10 pending determination of the copy protection and redistribution control rights associated with the received signal. If the default rights may be "copy and redistribute freely", it will be appreciated that "asserting" the rights may constitute turning off (or refraining from activating) copying or redistribution limitation mechanisms.

In state 204 (FIG. 2), the device 10 begins sampling the received signal for embedded, valid CGMS-A+RC information. For efficiency, sampling is only performed within VBI lines that are known to potentially carry embedded CGMS-A+RC information, recognized VBI standards which potentially govern analog video signals of the determined video format. The term "valid" above refers to assuming that the received signal is governed by one of a set of CGMS-A+RC values which have passed an integrity check such as a CRC or parity bit check.

In the present example, the device 10, does not detect any valid CGMS-A+RC information in the first two frames M-3 and M-2 (FIG. 3), either because no CGMS-A+RC information is present in these frames or because it is corrupted and thus is invalid. Therefore the device 10 remains in state 204, as indicated by region 382 of device state timeline 380 of FIG. 3. Put another way, a transition 212 (FIG. 2) occurs from state 204 back to the same state 204 for each failure to detect CGMS-A+RC information in a frame.

In the third frame M-1 (FIG. 3), however, device 10 detects a valid baseline set of valid CGMS-A+RC values. This results in a transition 214 of the device 10 from state 204 to state 206 (FIG. 2). State 206 is indicated by region 384 of device state timeline 380 (FIG. 3). As shown in rights timeline 390, copy protection and redistribution control rights remain unknown (as indicated by region 392) despite the transition 214, pending confirmation of the detected CGMS-A+RC values.

While in state 206, the device 10 continues to sample the appropriate VBI line(s) in frames M, M+1, etc., for repeated instances of the CGMS-A+RC values. Because the identity of the VBI line(s) in which CGMS-A+RC information is located will have been determined in state 204, in state 206 the sampling may be restricted to only those VBI lines in state 206 and state 208 (described below) for greater efficiency. When a repeated instance is detected, it is compared against the baseline CGMS-A+RC values for purposes of confirming the CGMS-A+RC information. This occurs until either Z instances of valid CGMS-A+RC values are detected or until P frames have been sampled. Z may equal 3 and P may equal 240 for example. As sampling is performed, the device 10 remains in state 206, as indicated by region 384 of the device state timeline 380 of FIG. 3. For each frame that is sampled before either Z instances of valid CGMS-A+RC values matching the baseline values are detected or until P frames have been sampled, a transition 216 (FIG. 2) from state 206 back to the same state 206

If P frames are sampled without detecting Z valid instances of CGMS-A+RC information matching the baseline values, a transition 218 from state 206 back to state 204 (FIG. 2) results. In this case, the previously detected baseline CGMS-A+RC values are discarded and a new set of baseline values is sought. This may occur for example if the CGMS-A+RC values in the analog video signal have changed since the original baseline values were detected. Transition 218 is not shown in FIG. 3.

If Z valid instances of CGMS-A+RC values matching the baseline values are detected, the baseline CGMS-A+RC values are deemed to be confirmed. This results in a transition 220 from state 206 to state 208 (FIG. 2) in which CGMS-A+RC values are periodically reconfirmed (as will be described). State 208 is indicated by region 386 of device state timeline 380 of FIG. 3. In state 208, the copy protection and redistribution control rights for the analog video signal's content change from "unknown" to the confirmed CGMS-A+RC values, as indicated by region 394 of rights timeline 390 of FIG. 3. This change may be referred to as the "triggering" of the baseline copy protection and redistribution control values. Depending upon the triggered values, copy protection and/or redistribution control enforcement mechanisms (e.g. encryption) may be automatically activated within the sink device 10.

Figure 4:
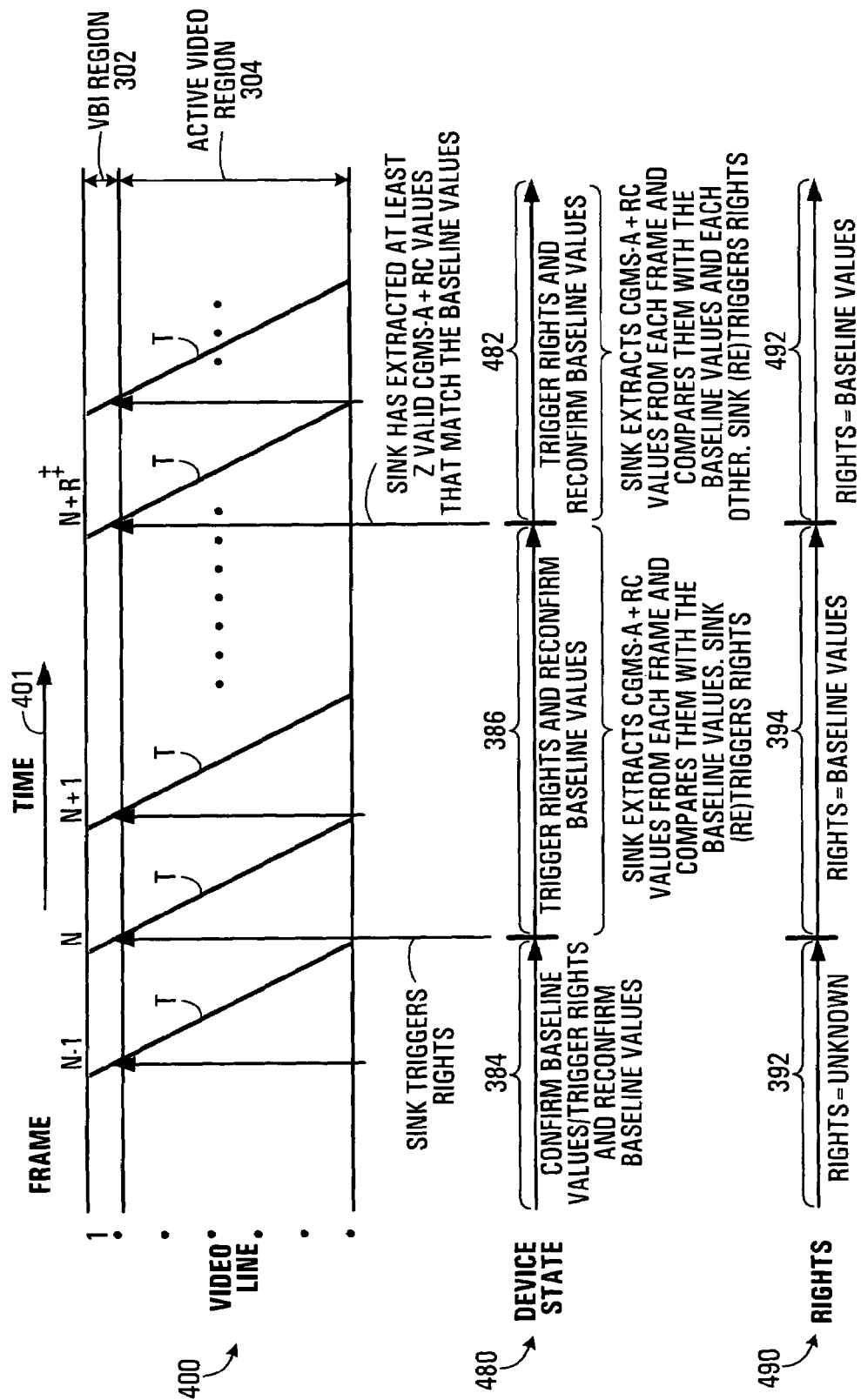
FIGS. 4 and 5 illustrate operations for reconfirming CGMS-A+RC information within a progressive analog video signal.

Turning to FIG. 4, operation of the exemplary sink device 10 of FIG. 1 for CGMS-A+RC information within a progressive analog video signal is illustrated. The operation illustrated in FIG. 4 follows the detecting and confirming operation illustrated in FIG. 3. FIG. 4 includes a scan trajectory timeline 400, a device state timeline 480, and a rights timeline 490, which are extensions of scan trajectory timeline 300, device state timeline 380, and rights timeline 390 (respectively) of FIG. 3, but represent a later time period. Certain regions of the timelines 380 and 390 from FIG. 3 (e.g. regions 384 and 386 of timeline 380 and regions 392 and 394 of timeline 390) are reproduced in FIG. 4 to illustrate continuity. Time for all three of the timelines 400, 480 and 490 shown in FIG. 4 is indicated on the horizontal axis, as illustrated by arrow 401.

For purposes of FIG. 4, it is assumed that the analog video sink device 10 of FIG. 1 has entered state 208 of FIG. 2 (region 386 of the device timeline 480 of FIG. 4) after having completed the operation shown in FIG. 3, and that the copy protection and redistribution control rights of the device 10 have been set to the baseline values, as indicated by region 394 of the rights timeline 490 of FIG. 4.

In state 208, the device 10 continues to sample the analog video signal for CGMS-A+RC information so that any changes in CGMS-A+RC information will be detected and the copy protection and redistribution control rights updated accordingly. FIG. 4 illustrates the case in which the CGMS-A+RC information is re-detected and determined not to have changed from the original baseline values.

In particular, the device 10 continues to sample the appropriate VBI lines in frames N, N+1, etc., for further instances of the CGMS-A+RC values. This occurs until either Z instances of valid CGMS-A+RC values matching either the baseline values or each other are detected, or until R frames have been sampled. Z may equal 3 and R may equal 240 for example. As sampling is performed, the device 10 remains in state 208, as indicated by region 386 of the device state timeline 480 of FIG. 4. In fact, the device may follow transition 222 (FIG. 2) from state 208 back to the same state 208 for each frame that is sampled before either Z instances of valid CGMS-A+RC values matching either the baseline values or each other are detected or until R frames have been sampled.

If R frames are sampled without detecting Z valid instances of CGMS-A+RC information matching the baseline values or each other, a transition 226 from state 208 back to state 204 (FIG. 2) occurs. In this case, the previously detected baseline CGMS-A+RC values are discarded and a new set of baseline values is sought. Transition 226 is not shown in FIG. 4.

Assuming that Z valid instances of CGMS-A+RC values matching the baseline values are detected, the baseline CGMS-A+RC values are deemed to be reconfirmed. This may result in a transition 224 from state 208 back to the same state 208 (FIG. 2), and is indicated by region 482 of device state timeline 480 of FIG. 4. The copy protection and redistribution control rights at the device 10 remain unchanged (i.e. the baseline values are maintained), as indicated by region 492 of rights timeline 490 of FIG. 4.

Of course, it is possible that, while the device 10 is in state 208, the CGMS-A+RC information in the video stream will change. This possibility is illustrated in FIG. 5.

Figure 5:
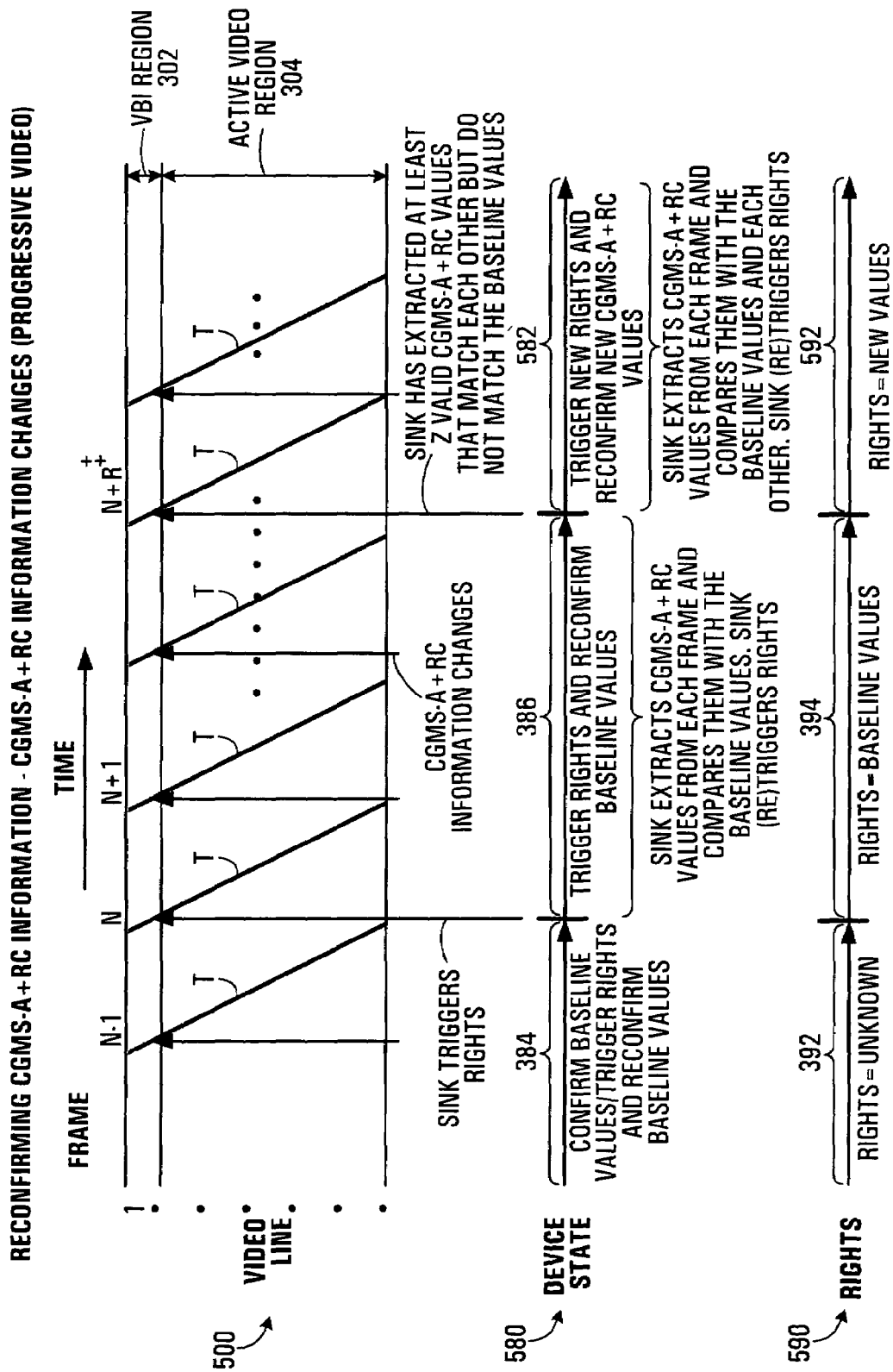

FIG. 5 is the same as FIG. 4 except that, during sampling of the CGMS-A+RC information in the video stream while in state 208 of FIG. 2, Z valid instances of CGMS-A+RC are detected which do not match the baseline values but which do match each other. This reflects a situation in which the copy protection and redistribution control rights associated with the video stream have changed, possibly due to a channel change at the sink device 10 or due to a transition between copyrighted video content and video content in which no copyright is asserted in the received analog video stream.

As illustrated, FIG. 5 includes a scan trajectory timeline 500, a device state timeline 580, and a rights timeline 590, which are extensions of scan trajectory timeline 300, device state timeline 380, and rights timeline 390 (respectively) of FIG. 3 but which represent a later time period. As in FIG. 4, FIG. 5 reproduces certain regions of the timelines 380 and 390 of FIG. 3 (e.g. regions 384 and 386 of timeline 380 and regions 392 and 394 of timeline 390).

When Z valid instances of CGMS-A+RC are detected which do not match the baseline values but which do match each other, this results in a state transition 224 (FIG. 2) from state 208 back to the same state 208 (i.e. state does not change). However, upon this transition, the copy protection and redistribution control rights are updated to the new CGMS-A+RC values (see region 592 of rights timeline 590 of FIG. 5), which become the new baseline values. Thereafter, the device 10 remains in state 208, continuing to sample the analog video signal for CGMS-A+RC information so that any changes in CGMS-A+RC information will be detected (see region 582 of device state timeline 580 of FIG. 5).

At any time, if a change in the video format is detected when the device is in any of states 204, 206 or 208, operation returns to state 202 for detection of the new video format via state transitions 230, 232 or 234 respectively (FIG. 2). Once the new video format is determined, the operation shown in FIGS. 3, 4 and/or 5 is repeated for the new video format.

Operation shown in FIG. 3 (as well as FIGS. 4 and 5) assumes that the received analog video signal is a progressive video signal. It is of course possible that the received analog video signal may be an interlaced video signal. If this is the case, the operation of FIG. 3 would instead appear as shown in FIG. 6.

Figure 6:
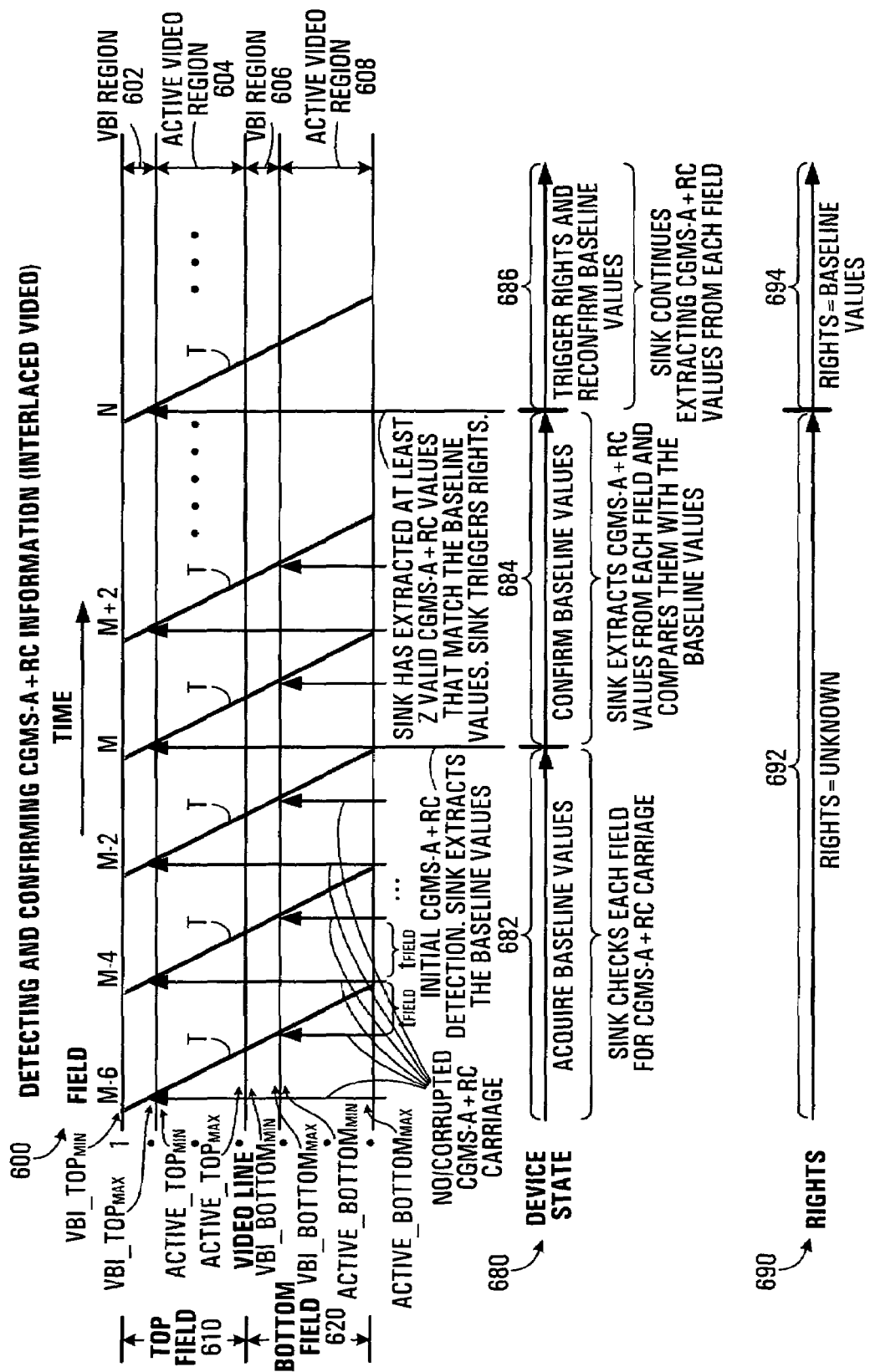
FIG. 6 illustrates operation for detecting and confirming CGMS-A+RC information within an interlaced analog video signal.

Referring to FIG. 6, operation of an exemplary sink device 10 (FIG. 1) for detecting and confirming CGMS-A+RC information within an interlaced analog video signal is illustrated. FIG. 6 includes a scan trajectory timeline 600, a device state timeline 680, and a rights timeline 690, which are similar to scan trajectory timeline 300, device state timeline 380, and rights timeline 390 of FIG. 3 (respectively).

As illustrated, scan trajectory timeline 600 shows the receipt of VBI lines and active video lines comprising an interlaced video signal over time by sink device 10 (FIG. 1). Each frame trajectory T represents the VBI video lines and active video lines of a single frame of the received signal. In particular, each frame trajectory T represents the VBI and active video lines of a top field 610 (comprising odd line numbers) and a bottom field 620 (comprising even line numbers). Top field 610 has a VBI region 602 and active video region 604, while bottom field 620 has a VBI region 606 and active video region 608. Field numbers (e.g. field M-6, M-4, etc., where M is an integer) are identified above the trajectories T.

In the top field 610, VBI lines are numbered $VBI\_top_{min}$ ($VBI\_top_{min}$ typically being 1) to $VBI\_top_{max}$ and active video lines are numbered $Active\_top_{min}$ to $Active\_top_{max}$. In the bottom field 620, VBI lines are numbered $VBI\_bot_{min}$ ($VBI\_bot_{min}$ typically being 263.5 for a 525 line interlaced video format) to $VBI\_bot_{max}$ (e.g. 283.5 for a 525 line interlaced video format) and active video lines are numbered $Active\_bot_{min}$ to $Active\_bot_{max}$. The values of $VBI\_top_{min}$, $VBI\_top_{max}$, $Active\_top_{min}$, $Active\_top_{max}$, $VBI\_bot_{min}$, $VBI\_bot_{max}$, $Active\_bot_{min}$ and $Active\_bot_{max}$ are dictated by the video format of the received interlaced video signal. The amount of time required to receive the VBI lines and active video lines of a single field ("$t_{field}$") is dictated by the vertical frequency of the received signal. It is assumed that at least some of the VBI lines in some of the fields of FIG. 6 carry CGMS-A+RC information.

The example illustrated in FIG. 6 is similar to that illustrated in FIG. 3 except that scanning for CGMS-A+RC information is performed field-by-field rather than frame-by-frame. For purposes of FIG. 6, device 10 is assumed to initially be in state 204 of FIG. 2 (i.e. video format has been determined).

As illustrated in FIG. 6, the device 10 initially does not detect any valid CGMS-A+RC information in the first six fields M-6 to M-1, either because the CGMS-A+RC information is not present in these fields or because it is corrupted and thus invalid. Accordingly the device 10 remains in state 204, as indicated by region 682 of device state timeline 680.

In the seventh field M, however, device 10 detects a valid baseline set of valid CGMS-A+RC values. This results in a transition 214 of the device 10 from state 204 to state 206 (FIG. 2). This is indicated by region 684 of device state timeline 680 (FIG. 6). As shown in rights timeline 690, copy protection and redistribution control rights remain unknown (see region 692) pending confirmation of the received CGMS-A+RC values.

While in state 206, the device 10 continues to sample the appropriate VBI lines in fields M+1, M+2, etc., for repeated instances of the CGMS-A+RC values in a similar manner to that described above in connection with FIG. 3, until either Z instances of valid CGMS-A+RC values are detected or until P fields have been sampled. Assuming that Z valid instances of CGMS-A+RC values matching the baseline values are received, the baseline CGMS-A+RC values are deemed to be confirmed and a transition 220 occurs from state 206 to state 208 (FIG. 2). State 208 is indicated by region 686 of device state timeline 680 of FIG. 6. In state 208, the copy protection and redistribution control rights for the analog video signal's content change from "unknown" to the confirmed CGMS-A+ RC values, as indicated by region 694 of rights timeline 690 of FIG. 6.

In the interlaced video case, detecting and confirming CGMS-A+RC information occurs as illustrated in FIG. 4 and reconfirming CGMS-A+RC information occurs as shown in FIG. 5, with the exception that sampling for CGMS-A+RC information would occur field-by-field rather than frame-by-frame. Thus, in state 208 of FIG. 2, the device 10 would continue until either Z instances of valid CGMS-A+RC values matching either the baseline values or each other are detected, or until R fields (versus frames) have been sampled.

Advantageously, detection of the CGMS-A+RC information as described in FIGS. 2 to 6 permits copying and redistribution rights associated with an analog video signal to be determined by an analog video sink device regardless of the video format of the received signal and regardless of the VBI standard according to which CGMS-A+RC information was inserted. Furthermore, copy protection and redistribution control rights will be automatically updated in the event of a detected change in the CGMS-A+RC values in the received analog video stream. Detection of CGMS-A+RC values can be performed even if the received video signal changes from progressive to interlaced or vice-versa. Once detected, the CGMS-A+RC values may govern the automatic limitation of either or both of copying and redistribution of the analog video signal at the device.

Table 5 illustrates values for P, R and Z which should provide a reasonable response time for CGMS-A+RC detection. It will be appreciated that the value of Z indicated in Table 5 (i.e. 3) is one less than the smallest number of repeated instances of CGMS-A+RC information that should occur in any of the VBI standards and video formats indicated in Table 5. That is, each of the standards and video formats indicated in Table 5 should repeat CGMS-A+RC information at least 4 times within the indicated number P or R of frames or fields, with some of the standards and video formats repeating CGMS-A+RC information more than 4 times during this time. This should permit CGMS-A+RC detection even in a noisy analog video signal.

TABLE 5

Exemplary P, R, and Z Values

| VBI Standard | Video Format | P | R | Z | CGMS-A + RC Detection Time Range |
|---|---|---|---|---|---|
| CEA-805-A | 525p | 240 | 240 | 3 | ~0.05 to 4 seconds |
|  | 750p | 240 | 240 | 3 | ~0.05 to 4 seconds |
|  | 1080i | 240 | 240 | 3 | ~0.05 to 4 seconds |
| CEA-608-B | 525i | 7200 | 7200 | 3 | ~0.1 to 120 seconds |
| IEC 61880 | 525i | 240 | 240 | 3 | ~0.05 to 4 seconds |
| IEC 61880-2 | 525p | 240 | 240 | 3 | ~0.05 to 4 seconds |
| ETSI EN 300 294 | 625i | 200 | 200 | 3 | ~0.06 to 4 seconds |
| IEC 62375 | 625p | 200 | 200 | 3 | ~0.06 to 4 seconds |
| JEITA EIA-J 1204 | 525i | 240 | 240 | 3 | ~0.05 to 4 seconds |
| JEITA EIA-J 1204-1 | 750p | 240 | 240 | 3 | ~0.05 to 4 seconds |
| JEITA EIA-J 1204-2 | 1125i | 240 | 240 | 3 | ~0.05 to 4 seconds |

In Table 5, the exemplary R values equal the corresponding P values. It will be appreciated that this is not a requirement.

As should now be appreciated, efficiency is promoted in the above-described embodiments by pre-configuring the embodiments, based on knowledge of prevalent VBI standards, with the identity of the VBI lines potentially carrying CGMS-A+RC information, so that the embodiments can restrict their sampling to those VBI lines and avoid unnecessarily sampling other VBI lines. It is of course possible that new VBI standards may be proposed or become dominant which call for the insertion of CGMS-A+RC information in VBI lines that were not previously used to carry this information. Alternatively, one or more known VBI standards may fall out of favor or may be phased out. Accordingly, some embodiments of the invention may facilitate periodic reconfiguration of sink devices with information regarding new VBI lines to be sampled or VBI lines which no longer require sampling. Reconfiguration may be achieved by way of a software upgrade at the sink device for example, or through other means such as a reconfiguration utility (implemented through software, firmware and/or hardware) possibly employing a graphical user interface displayed on a display and input device such as a keyboard or mouse for example for manipulation by a user of the sink device, such as a technician. Similarly, some embodiments may facilitate periodic reconfiguration of sink devices to permit detection of new video formats or to discontinue attempts to detect video formats which have been phased out.

As will be appreciated by those skilled in the art, modifications to the above-described embodiments can be made without departing from the essence of the invention. For example, some embodiments may not implement a state machine per se, but rather may simply effect the behavior exhibited in FIGS. 3 to 6, as described. This behavior may be effected by way of logic implemented through software, firmware and/or hardware for example.

Also, it should be appreciated that the values of Z, P and R indicated in Table 5 are suggested values which may not be optimal for all applications. It may be desirable to vary the value of Z in alternative embodiments based on a desired or acceptable degree of confidence in detected CGMS-A+RC information for the relevant application, e.g. based on the reliability of underlying video signal transport mechanisms. Similarly, the values of P and R may be varied based on acceptable confirmation and reconfirmation delay periods for the relevant application, which may be based on an anticipated average duration between CGMS-A+RC value changes in the received analog video signal or upon a maximum acceptable duration for an analog video signal to be received before rights are asserted.

Some embodiments may not expressly maintain a count of sampled frames or fields to determined whether P or R frames/fields have been sampled. Instead, some embodiments may sample frames or fields until a predetermined time period has elapsed. The duration of the predetermined time period may be determined based on knowledge of the duration of the frame times and/or fields times of a received video signal which is known to have a particular vertical frequency for example. The duration of the predetermined time period for initial confirmation of CGMS-A+RC information may differ from the predetermined time period for reconfirmation of CGMS-A+RC information.

As described above in conjunction with Table 3, copy protection indicators and redistribution control indicators may be transmitted together or individually. When transmitted individually, copy protection indicators and redistribution control indicators could be embedded in different VBI lines. Whatever the case, the above-described approach may be used to detect either or both of embedded copy protection indicators and redistribution control indicators. For example, a sink device could maintain one state machine similar to state machine 200 of FIG. 2 for detecting a copy protection indicator embedded in one VBI line and another state machine similar to state machine 200 for detecting a redistribution control indicator embedded in another VBI line.

It will also be appreciated that copy protection indicators do not necessarily specify the number of times that an analog video signal may be copied. Copy protection indicators may instead indicate, e.g., a duration of time, such as one week, during which copying may be performed. Similarly, redistribution control indicators may not simply be "on" or "off" settings but rather may limit redistribution control in other ways. For example, redistribution control may be limited to a geographical location such as a district or a municipality or limited to a particular device such as a television with no recording capabilities.

Finally, it will be appreciated that determination of video format does not necessarily require detecting both of the horizontal frequency and vertical frequency of an analog video signal. It may for example be possible to detect only one of the horizontal frequency and vertical frequency and to make "educated guesses" as to the other of the horizontal frequency and vertical frequency. However this may be less efficient and more time consuming than simply detecting horizontal frequency and vertical frequency.

Other modifications will be apparent to those skilled in the art and, therefore, the invention is defined in the claims.

What is claimed is:

1. A method comprising:
   (a) determining a video format of an analog video signal;
   (b) based at least on said determining, identifying a region of said analog video signal that may contain at least one of a copy protection indicator and a redistribution control indicator;
   (c) detecting said at least one indicator in said region of said analog video signal;
   (d) confirming said detected at least one indicator by:
      (i) detecting another instance of said at least one indicator in said region of said analog video signal;
      (ii) comparing said another instance of said at least one indicator with said at least one indicator detected in (c);
      (iii) repeating (d)(i) and (d)(ii) until Z instances of said at least one indicator matching said at least one indicator detected in (c) are detected during a predetermined time period, Z being an integer greater than or equal to one, said predetermined time period comprising a transmission time of P frames or fields of said analog video signal, P being an integer greater than or equal to one;
   (e) limiting at least one of copying and redistribution of said analog video signal in accordance with said confirmed at least one indicator; and
   (f) reconfirming said detected at least one indicator by:
      (i) detecting a further instance of said at least one indicator in said region of said analog video signal;
      (ii) comparing said further instance of said at least one indicator with said at least one indicator detected in (c); and
      (iii) repeating (f)(i) and (f)(ii) until Z instances of said at least one indicator matching said at least one indicator detected in (c) are detected during another time period comprising a transmission time of R frames or fields of said analog video signal, R being an integer greater than or equal to one, wherein P and R are independently configurable.

2. The method of claim 1 wherein said determining a video format comprises detecting a horizontal frequency of said analog video signal and detecting a vertical frequency of said analog video signal.

3. The method of claim 1 wherein said region of an analog video signal comprises one or more video lines of a vertical blanking interval of said analog video signal.

4. The method of claim 1 wherein, if said predetermined time period elapses without detecting Z instances of said at least one indicator matching said at least one indicator detected in (c), said confirming is unsuccessful, and further comprising repeating (c), (d) and (e).

5. The method of claim 1 further comprising, upon detecting a change in either or both of said video format and said vertical frequency, repeating (a), (b), (c), (d) and (e).

6. The method of claim 1 wherein said at least one indicator comprises Copy Generation Management System Analog plus Redistribution Control (CGMS-A+RC) information.

7. A machine-readable medium including machine-executable code for execution at a computing device, comprising:
   (a) machine-executable code for determining a video format of an analog video signal;
   (b) machine-executable code for identifying a region of said analog video signal that may contain at least one of a copy protection indicator and a redistribution control indicator based at least on said determining;
   (c) machine-executable code for detecting said at least one indicator in said region of said analog video signal;
   (d) machine-executable code for confirming said detected at least one indicator by:
      (i) detecting another instance of said at least one indicator in said region of said analog video signal;
      (ii) comparing said another instance of said at least one indicator with said at least one indicator detected by (c);
      (iii) repeating (d)(i) and (d)(ii) until Z instances of said at least one indicator matching said at least one indicator detected by (c) are detected during a predetermined time period, Z being an integer greater than or equal to one, said predetermined time period comprising a transmission time of P frames or fields of said analog video signal, P being an integer greater than or equal to one;
   (e) machine-executable code for limiting at least one of copying and redistribution of said analog video signal in accordance with said confirmed at least one indicator; and
   (f) machine-executable code for reconfirming said detected at least one indicator by:
      (i) detecting a further instance of said at least one indicator in said region of said analog video signal;
      (ii) comparing said further instance of said at least one indicator with said at least one indicator detected by (c); and
      (iii) repeating (f)(i) and (f)(ii) until Z instances of said at least one indicator matching said at least one indicator detected by (c) are detected during another time period comprising a transmission time of R frames or fields of said analog video signal, R being an integer greater than or equal to one, wherein P and R are independently configurable.

8. The machine-readable medium of claim 7 wherein said determining a video format comprises detecting a horizontal frequency of said analog video signal and detecting a vertical frequency of said analog video signal.

9. The machine-readable medium of claim 7 wherein said region of an analog video signal comprises one or more video lines of a vertical blanking interval of said analog video signal.

10. The machine-readable medium of claim 7 wherein, if said time period elapses without detecting Z instances of said at least one indicator matching said at least one indicator detected by (c), said confirming is unsuccessful, and further comprising machine-executable code for re-executing (c), (d) and (e).

11. The machine-readable medium of claim 7 further comprising machine-executable code for, upon detecting a change in either or both of said video format and said vertical frequency, repeating (a), (b), (c), (d) and (e).

12. The machine-readable medium of claim 7 wherein said at least one indicator comprises Copy Generation Management System Analog plus Redistribution Control (CGMS-A+RC) information.

13. A computing device comprising a processor and memory in communication with said processor storing machine-executable code adapting said computing device to:
   (a) determine a video format of an analog video signal;
   (b) based at least on said determining, identify a region of said analog video signal that may contain at least one of a copy protection indicator and a redistribution control indicator;
   (c) detect said at least one indicator in said region of said analog video signal;
   (d) confirm said detected at least one indicator by:
      (i) detecting another instance of said at least one indicator in said region of said analog video signal;
      (ii) comparing said another instance of said at least one indicator with said at least one indicator detected by (c);
      (iii) repeating (d)(i) and (d)(ii) until Z instances of said at least one indicator matching said at least one indicator detected by (c) are detected during a predetermined time period, Z being an integer greater than or equal to one, said predetermined time period comprising a transmission time of P frames or fields of said analog video signal, P being an integer greater than or equal to one;
   (e) limit at least one of copying and redistribution of said analog video signal in accordance with said confirmed at least one indicator; and
   (f) reconfirm said detected at least one indicator by:
      (i) detecting a further instance of said at least one indicator in said region of said analog video signal;
      (ii) comparing said further instance of said at least one indicator with said at least one indicator detected in (c); and
      (iii) repeating (f)(i) and (f)(ii) until Z instances of said at least one indicator matching said at least one indicator detected in (c) are detected during another time period comprising a transmission time of R frames or fields of said analog video signal, R being an integer greater than or equal to one, wherein P and R are independently configurable.

14. The computing device of claim 13 wherein said determining a video format comprises detecting a horizontal frequency of said analog video signal and detecting a vertical frequency of said analog video signal.

15. The computing device of claim 13 wherein said region of an analog video signal comprises one or more video lines of a vertical blanking interval of said analog video signal.

16. The computing device of claim 13 wherein, if said time period elapses without detecting Z instances of said at least one indicator matching said at least one indicator detected in (c), said confirming is unsuccessful, and said device is further adapted to repeat (c), (d) and (e).

17. The computing device of claim 13 further adapted to, upon detecting a change in either or both of said video format and said vertical frequency, repeat (a), (b), (c), (d) and (e).

18. The computing device of claim 13 wherein said at least one indicator comprises Copy Generation Management System Analog plus Redistribution Control (CGMS-A+RC) information.

* * * * *